G. S. CONNOR.
TIRE.
APPLICATION FILED FEB. 11, 1911.
998,753.
Patented July 25, 1911.
2 SHEETS—SHEET 1.
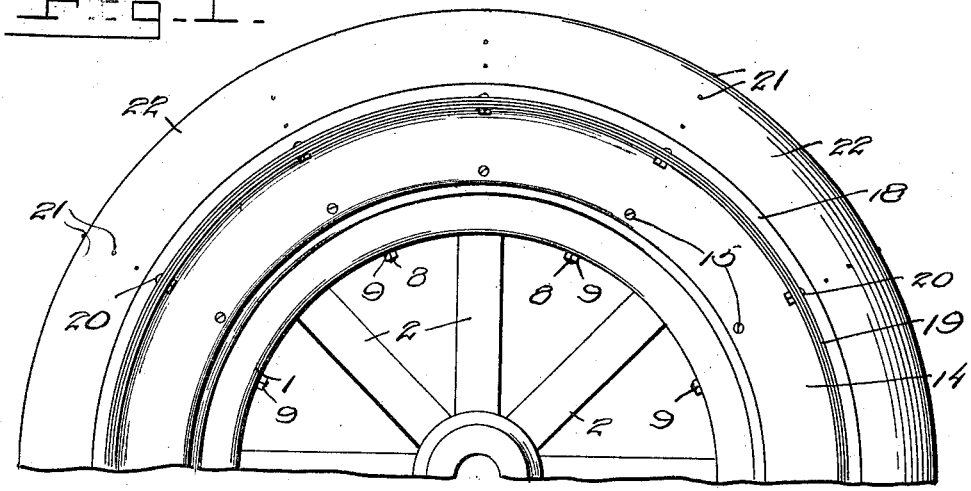
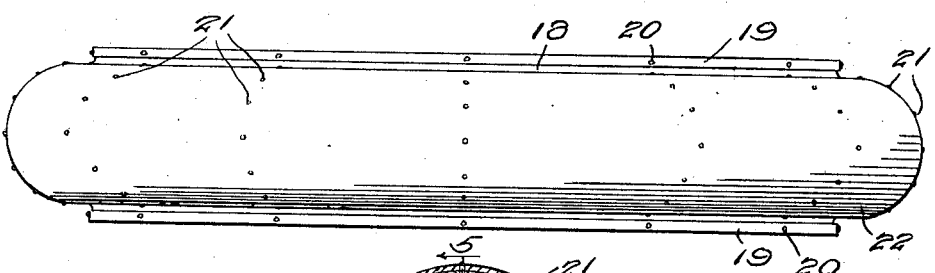
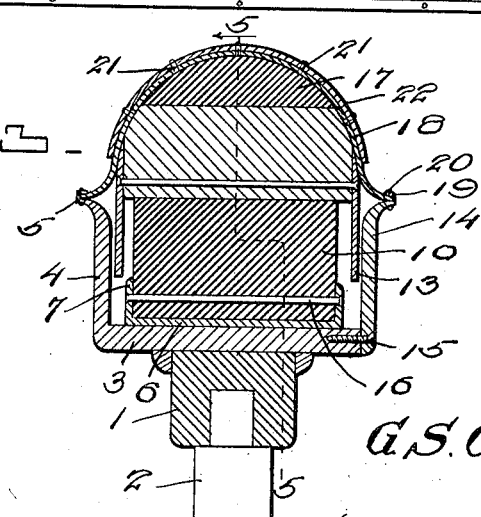
Witnesses
Inventor
G. S. Connor,
By Harry Ellis Chaudlee,
Attorney

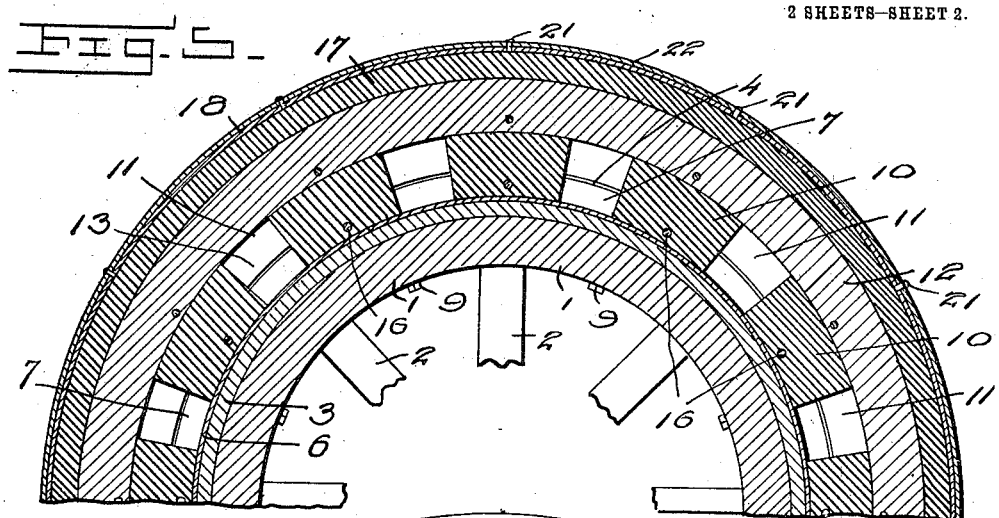
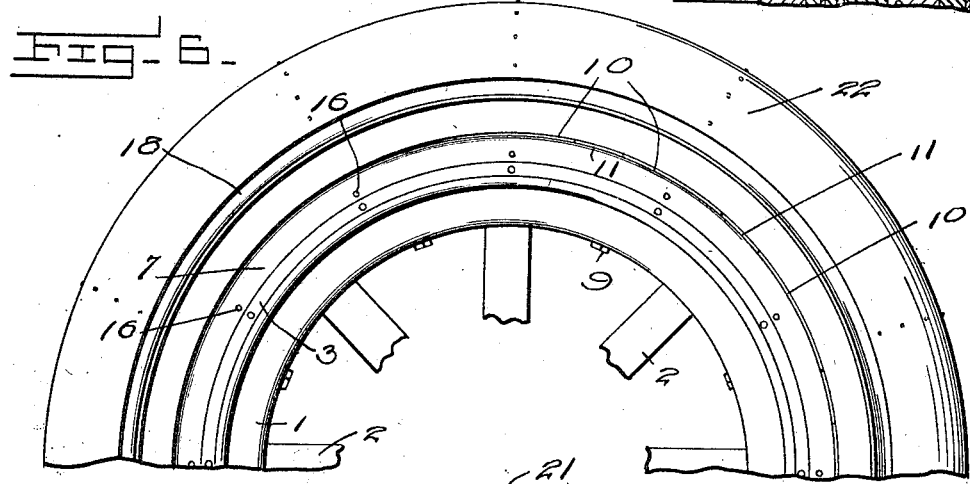
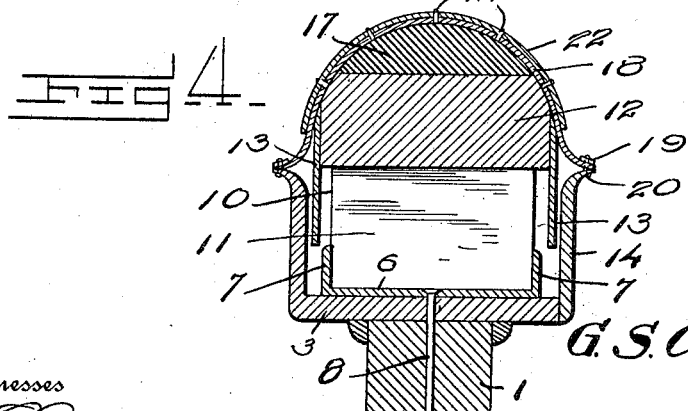

UNITED STATES PATENT OFFICE.

GEORGE S. CONNOR, OF ST. PAUL, MINNESOTA.

TIRE.

998,753. Specification of Letters Patent. Patented July 25, 1911.

Application filed February 11, 1911. Serial No. 607,922.

*To all whom it may concern:*

Be it known that I, GEORGE S. CONNOR, a citizen of the United States, residing at St. Paul, in the county of Ramsey and State of Minnesota, have invented certain new and useful Improvements in Tires, of which the following is a specification.

My invention relates to improvements in tires, and has for its leading object the provision of an improved form of resilient tire which will possess all the elasticity or shock absorbing qualities of a pneumatic tire while obviating the annoyances so frequently occasioned by the puncturing or blowing out of said tires.

A further object of my invention is the provision of a resilient tire of simple construction in which the various parts may be readily replaced when worn and which will be of such construction as to prevent dust or moisture from coming into contact with the inner parts of the tire to thus prolong the life of said parts.

Other objects and advantages of my improved tire will be apparent from the following description taken in connection with the accompanying drawings, and it will be understood that I may make any changes in the construction lying within the scope of the claim without departing from the spirit of the invention.

Figure 1 represents a fragmentary side elevation of a wheel equipped with my improved tire. Fig. 2 represents a top plan view thereof. Fig. 3 represents a cross-sectional view of the tire through the resilient block. Fig. 4 represents a similar view through the space between said resilient blocks. Fig. 5 represents a fragmentary longitudinal sectional view on the line 5—5 of Fig. 3, and, Fig. 6 represents a fragmentary side elevation with the outer rim flange removed.

In the drawings, the numeral 1 designates the felly or rim base of the tire to which are secured the spokes 2, while surrounding the felly is the plate 3 having the flange 4 upstanding at one side, said flange having an outwardly curving edge 5. Mounted on the plate 3 is a second plate 6 of less width than the plate 3 and having an upstanding flange 7 at each side thereof, bolts 8 having their heads engaging the outer face of the plate 6 and passing through the plate 3 and the felly 1 and having nuts 9 on their inner ends and bearing against the felly whereby the said bolts serve to secure the plates 3 and 6 securely in position upon the felly.

Resting upon the plate 6 and engaged by its flanges 7 are a plurality of rubber or other resilient blocks 10 located a slight distance apart to provide the spaces 11 therebetween to permit of more ready compression of said blocks and allow of their lateral expansion when vertically compressed. Surrounding the felly and plates but spaced therefrom and resting on the resilient blocks is the circular wooden member or supplemental rim 12 which rests on the resilient blocks, plates 13 being secured to the sides of said member 12 and depending between the flange 4 and the flange 7 on one side of the wheel and between the flange 7 and the ring 14 secured to the other side of the plate 3 by the screws or bolts 15.

From the foregoing description taken in connection with the drawings the construction of my improved wheel rim will be readily understood and it will be seen that the member 12 is supported on the resilient blocks 10 which are secured to the flanges 7 by the locking bolts or rods 16, pressure on any point on the member 12 forcing it toward the felly and compressing the block or blocks at that point, said blocks springing out into normal position as soon as the pressure is removed, while the engagement of the plates 13 between the flanges guides the movement of the member 12 and prevents it from moving laterally off the felly.

The member 12 may either form the tire of the wheel to rest on the road or I may secure on the periphery thereof the layer of rubber or cushioning material 17 covered by the layer 18 of leather, the edges of said strip of leather being covered by the clamping ring 19, fastenings 20 passing through said ring and the leather and the portion 5 of the flange 4 and ring 14 to secure the leather to said portions 5, the leather thus passing over the member 12 and its cushion 17 and limiting the outward movement of said parts. Secured to the outer face of the leather strip by the rivets 21 is the second strip 22 of leather forming the tread of the wheel.

It will thus be seen that I have provided a simple and thoroughly efficient resilient wheel in which the cushion under the tread face of the wheel in connection with the resilient blocks 10 serve to absorb the shock when the wheel passes over bumps or obstructions, while the leather serves both as a tread, a closure for the compartment included between the plate 3 with its flange and ring, thus keeping mud out of the spaces 11 and the spaces in which the plates 13 move, and also serves to limit the outward movement of the member 12 and parts carried thereby.

I claim:

A resilient wheel, comprising a felly, a plate mounted on the felly and having an upstanding flange formed on one edge, a ring similar in shape to said flange removably secured to the other edge of the plate, a U-shaped plate of less width than the first plate mounted thereon, means passing through the two plates and the felly for securing the plates in position on the felly, spaced resilient blocks secured between the upstanding portions of the U-shaped plate, a wood ring surrounding the felly but spaced therefrom and resting on the resilient blocks, plates secured to the sides of the ring and extending inward between the upstanding portions of the U-shaped plate and the flange and ring of the other plate, a peripheral cushion member secured to the outer face of said wooden ring, a leather strip covering said cushion member and having its edges extending over the ring and resting on the upper edge of the flange and ring of the basal plate, a clamping ring resting on the upper face of the strip on each side, and bolts passing through said ring, the leather and the edges of the flange and ring of the plate for securing the edges of the strip thereto.

In testimony whereof I affix my signature, in the presence of two witnesses.

GEORGE S. CONNOR.

Witnesses:
 GEO. W. WOODS,
 W. O. SHAW.